United States Patent [19]
Shang et al.

[11] Patent Number: 5,683,768
[45] Date of Patent: Nov. 4, 1997

[54] PLASTIC FORMULATIONS FOR PLATELET STORAGE CONTAINERS AND THE LIKE

[75] Inventors: Shaye-wen Shang; Michael Tung-Kiung Ling, both of Vernon Hills; Lecon Woo, Libertyville; Christopher C. Cometa, Mundelein, all of Ill.

[73] Assignee: Baxter International Inc., Deerfield, Ill.

[21] Appl. No.: 360,913

[22] Filed: Dec. 21, 1994

[51] Int. Cl.$^6$ .......................................... A61J 1/10
[52] U.S. Cl. ................ 428/35.2; 428/35.5; 428/35.7; 604/403; 604/408; 525/66; 525/92 B
[58] Field of Search ..................... 525/66, 92 B; 428/35.2, 35.5, 35.7, 475.8, 476.1, 476.3, 517, 519, 36.92; 604/403, 408

[56] References Cited

U.S. PATENT DOCUMENTS

| | | | |
|---|---|---|---|
| 3,585,177 | 6/1971 | Gardner et al. | 525/60 |
| 3,600,466 | 8/1971 | Moriguchi et al. | 525/243 |
| 4,041,103 | 8/1977 | Davison et al. | 525/92 B |
| 4,112,989 | 9/1978 | Grode et al. | 383/127 |
| 4,140,162 | 2/1979 | Gajewski et al. | 428/35.5 |
| 4,210,686 | 7/1980 | Gajewski et al. | 428/35.2 |
| 4,301,800 | 11/1981 | Collins | 604/52 |
| 4,440,815 | 4/1984 | Zomorodi et al. | 428/36.92 |
| 4,453,940 | 6/1984 | Aoyagi et al. | 604/408 |
| 4,479,989 | 10/1984 | Mahal | 428/35.5 |
| 4,505,708 | 3/1985 | Gajewski et al. | 604/408 |
| 4,516,977 | 5/1985 | Herbert | 604/415 |
| 4,561,110 | 12/1985 | Herbert | 604/408 |
| 4,588,401 | 5/1986 | Kilkson | 604/408 |
| 4,588,777 | 5/1986 | Hotta | 525/93 |
| 4,640,856 | 2/1987 | Ferguson et al. | 428/34.9 |
| 4,795,782 | 1/1989 | Lutz et al. | 525/66 |
| 4,803,102 | 2/1989 | Raniere et al. | 428/35.2 |
| 4,804,564 | 2/1989 | Dobreski et al. | 428/35.5 |

(List continued on next page.)

FOREIGN PATENT DOCUMENTS

| | | |
|---|---|---|
| 114 964 | 8/1984 | European Pat. Off. . |
| 074 178 | 4/1986 | European Pat. Off. . |
| 216 509 | 4/1987 | European Pat. Off. . |
| 216 639 | 4/1987 | European Pat. Off. . |
| 229 184 | 7/1987 | European Pat. Off. . |
| 232 171 | 8/1987 | European Pat. Off. . |
| 310 143 | 4/1989 | European Pat. Off. . |
| 330 151 | 8/1989 | European Pat. Off. . |
| 377 121 | 7/1990 | European Pat. Off. . |
| 446 505 | 8/1991 | European Pat. Off. . |
| 468 768 | 1/1992 | European Pat. Off. . |
| 495 729 | 7/1992 | European Pat. Off. . |
| 0 540 842 | 8/1992 | European Pat. Off. . |
| 3200264 | 7/1982 | Germany . |
| 4017153 | 5/1990 | Germany . |
| 1 527 685 | 10/1978 | United Kingdom . |
| 2 001 657 | 2/1979 | United Kingdom . |
| 2 111 944 | 7/1983 | United Kingdom . |
| 2 146 614 | 5/1987 | United Kingdom . |
| WO 84/01292 | 4/1984 | WIPO . |
| WO 86/02041 | 4/1986 | WIPO . |
| WO 86/02042 | 4/1986 | WIPO . |
| WO 88/03027 | 5/1988 | WIPO . |
| WO 93/24568 | 3/1993 | WIPO . |
| WO 93/14810 | 8/1993 | WIPO . |

*Primary Examiner*—Rena Dye
*Attorney, Agent, or Firm*—Robert M. Barrett; Denise M. Serewicz; Bradford R.L. Price

[57] ABSTRACT

The invention provides a flexible plastic formulation capable of being RF sealed, extruded, cast or blow-molded, gas, steam and radiation sterilized. The plastic formulation of the invention comprises: a) from about 40 to about 90 percent by weight of a polyolefin polypropylene based material; b) from about 3 to about 25 percent by weight of a functionalized block copolymer, the functionalized block copolymer consisting essentially of a central block copolymer molecule including generally equal proportions of ethylene and butylene units, and terminal blocks of polystyrene; and c) from about 3 to about 20 percent by weight a nylon. The plastic formulations of the invention are useful in the manufacture of blood bags, tubing and the like.

6 Claims, 1 Drawing Sheet

U.S. PATENT DOCUMENTS

| | | | |
|---|---|---|---|
| 4,837,047 | 6/1989 | Sato et al. | 604/408 |
| 4,840,823 | 6/1989 | Chigami et al. | 428/35.5 |
| 4,892,604 | 1/1990 | Measells et al. | 156/244.24 |
| 4,956,212 | 9/1990 | Bekele | 428/36.6 |
| 4,965,108 | 10/1990 | Biel et al. | 428/476.3 |
| 4,997,880 | 3/1991 | Van Der Groep | 525/57 |
| 5,023,119 | 6/1991 | Yamakoshi | 604/385.1 |
| 5,026,347 | 6/1991 | Patel | 604/410 |
| 5,096,775 | 3/1992 | Sato et al. | 428/519 |
| 5,100,401 | 3/1992 | Patel | 604/410 |
| 5,167,657 | 12/1992 | Patel | 604/410 |
| 5,216,074 | 6/1993 | Imai et al. | 525/66 |
| 5,230,934 | 7/1993 | Sakano et al. | 428/35.7 |
| 5,317,059 | 5/1994 | Chundury et al. | 525/66 |
| 5,326,602 | 7/1994 | Rifi | 428/35.7 |

PLASTIC FORMULATIONS FOR PLATELET STORAGE CONTAINERS AND THE LIKE

BACKGROUND OF THE INVENTION

1. Field of the Invention

The invention generally relates to plastic formulations. More particularly, the invention relates to medical grade plastic formulations suited for contact with human blood and its components.

2. Description of the Prior Art

Most whole blood collected is not stored and used for transfusion. Instead, the whole blood is separated into its therapeutically proven components, which are themselves stored in plastic containers. These therapeutic blood components of whole blood include red blood cells, platelets and numerous other plasma-based fractions, such as albumen, gamma globulen, and factor VIII.

Patient care is improved by providing only the therapeutic blood components of whole blood which are required to treat the specific disease. The demand for the therapeutic blood components of whole blood is thus ever-increasing. Likewise, the demand for safe and effective systems and methods for collecting, separating, and storing the therapeutic components of processing whole blood is growing.

Typically, whole blood and its components are collected and stored in containers made of medical grade plastic formulations, such as polyvinyl chloride (PVC) plastic formulations. These PVC formulations must, by necessity, include a plasticizer, because PVC is not itself flexible enough for use in these containers. Plasticizers are known to leach, or extract, into the blood components which are stored in PVC containers. While there are no known adverse physiological results which are linked to the leaching of plasticizers into the blood components, it is of course, desirable to minimize, as much as possible, the contact between blood components and any material not normally found in the human body.

Another important characteristic of blood component storage containers is gas-permeability. Gas permeability is essential so that the living cells of the blood component, such as red blood cells and platelets, can exchange oxygen and carbon dioxide. This allows for the extended viability of the living blood component and longer storage times. With regard to PVC plastic formulations, as the amount of plasticizer decreases, gas permeability generally decreases. Reduced gas permeability is not optimal for the storage of certain blood components, such as platelets.

As a result of the problems and shortcomings of PVC plastic formulations, several efforts have been made to develop plastic material suitable for storing blood components from non-PVC plastics. These materials include flexible polyesters and polyolefins. Surprisingly, many of the materials tested, while giving indications of being good plastic materials for the manufacturer of blood bags, have caused blood stored in the containers to exhibit an undesirably high plasma hemoglobin content. This indicates that the lysis rate of the red blood cells in these containers is high. Examples of blood bags made from plastic formulations other than PVC are disclosed in U.S. Pat. Nos. 4,112,982; 4,140,162; 4,301,800; 4,479,989; and 5,026,347. Several of these patents also disclose additional components to reduce the lysis of red blood cells, such as, citrate esters, and antihemolytic plasticizers incorporated into plastic inserts.

Sterilization of the blood component storage container is also of great importance. The containers should be preferably sterilizable by ethylene oxide, steam and/or radiation sterilization, such as gamma radiation sterilization. U.S. Pat. No. 4,479,989 discloses that, although plastic formulations including polypropylene are heat-sterilizable, they are undesirable since they may not be radiation-sterilized.

Furthermore, plastic formulations should remain flexible at low temperatures during storage. Plastic materials including polypropylene homopolyers, or copolymers, or blends thereof, are disclosed as brittle at low temperatures and inherently stiff. This is, of course, a disadvantage.

It would, therefore, be advantageous to provide a plastic formulation which can be formed by extrusion and/or blow molding to provide a medical fluid container which has a flexible, collapsible film body with good low temperature flexibility, sufficient temperature resistance to softening and/or melting, radiation, steam and gas sterilizable, and sufficient gas-permeability to provide for the viability of the living blood components or other cellular matter therein. It would also be advantageous if the container was RF sealable, had superior optical clarity and a combination of flexibility and strength which imparted superior handling characteristics over a wide temperature range.

SUMMARY OF THE INVENTION

One aspect of the invention provides a flexible plastic formulation capable of being extruded, cast, calenderized and blow-molded, and radiation, gas and steam sterilized. The plastic formulation includes: a) from about 40 to about 90 percent by weight of a polypropylene based including polypropylene homopolymers admixed and reacted with copolymers including ethylene and propylene units, and optionally, butene units; b) from about 3 to about 25 percent by weight of a functionalized block copolymer, the functionalized block copolymer consisting essentially of: a central block of a copolymer molecule including generally equal proportions of ethylene and butylene units, and terminal blocks of polystyrene (SEBS); and c) from about 3 to about 20 percent by weight of polyamide material such as nylon. According to one preferred embodiment, the plastic material of the invention further includes from about 1.0 to about 40 percent by weight of non-functionalized SEBS component.

Another aspect of the invention provides a flexible, collapsible container capable of being Radio Frequency (RF) sealed, extruded and/or blow-molded, and radiation, gas and steam sterilized, which is made from the plastic formulation of the invention. The container of the invention may also be a multi-layered container wherein the plastic of the invention forms at least one laminated or co-extruded layer of the container.

A still further aspect of the invention is directed to a method of storing blood components, such as plasma and fresh frozen plasma, cryoprecipitate, red blood cells and platelets, in a container made from the plastic material of the invention.

DESCRIPTION OF THE PREFERRED EMBODIMENTS

Figure 1:
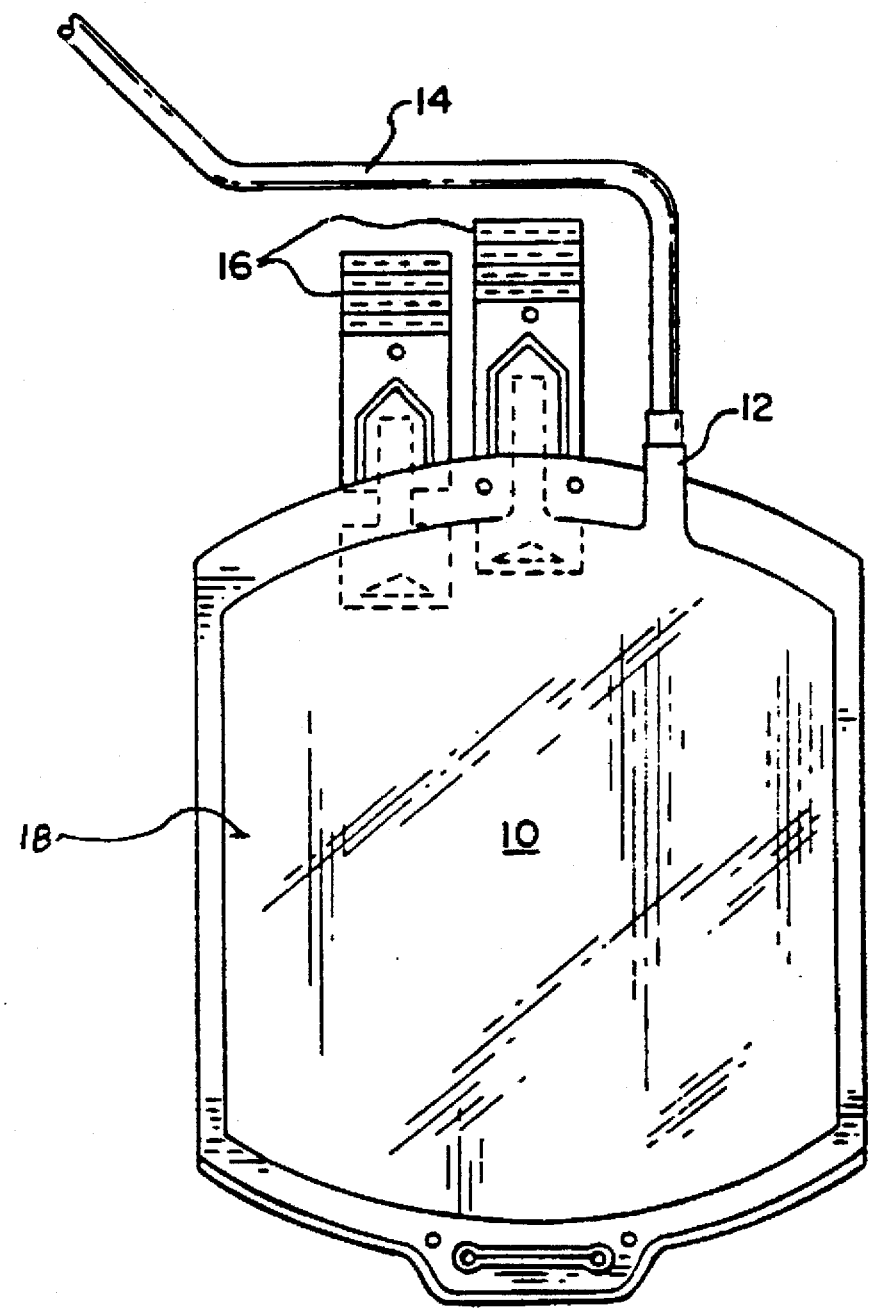
FIG. 1 is a planned view of a blood component container which is made of a plastic formulation which embodies the features of the invention.

The present invention provides a flexible plastic formulation and method for making and using such a plastic formulation. The plastic formulations of the invention are preferably used to make flexible, collapsible containers, such as plastic blood bags which are RF sealable, tubing and the like, as well as for medical solution containers. It is also contemplated that the plastic formulations of the invention can be used generally in other flexible containers and objects of various kinds. The plastic material of the invention may be extruded, co-extruded with other plastics, or blow-molded to form films and containers. The plastic materials of the invention have good low temperature brittleness and are useful as containers for fresh frozen plasma or cryoprecipitate. Containers made from the plastic materials of the invention are gas, steam and radiation-sterilizable. A further, and very important advantage of the invention is that blood containing bags manufactured from the plastic formulations of the invention exhibit superior gas permeability.

The plastic materials of the present invention are soft and flexible over a wide temperature range. Also, plastic formulations of the invention are preferably essentially free of liquid plasticizers and anti-hemolytic additives. Accordingly, when used, for example, to fabricate blood bags, a very low level of leaching materials from the plastic into the blood is achieved. In accordance with the invention, a flexible plastic formulation is provided, such plastic being capable of being extruded, co-extruded, and/or blow molded, into a flexible, collapsible container which is steam, gas and radiation sterilizable.

The plastic formulations of the present invention preferably include either three or four ingredients. The first ingredient is a polyolefin polypropylene based material including polypropylene homopolymers admixed and reacted with copolymers including ethylene and propylene units; and, optionally, the copolymers are terpolymers and include butene units. The second ingredient is a functionalized block copolymer. The block copolymer consists essentially of a central block copolymer molecule and terminal polymer blocks. The central copolymer molecule includes generally equal proportions of ethylene and butylene units, and the terminal polymer blocks are polystyrene (SEBS). The third ingredient is a polyamide RF sealable material, such as nylon. The fourth ingredient is a non-functionalized SEBS. The ingredients which are used to make the plastic formulations of the inventions are intimately admixed using conventional plastic blending techniques and are extruded and/or blow molded into thin films, tubing and the like, to construct flexible containers for receiving therein, among other things, blood components.

Referring to the polyolefin polypropylene based material, this material is included in the plastic formulations of the instant invention in an amount of from about 40 to about 90 percent by weight of the plastic formulation. More preferably, this material is included in the plastic formulation in an mount of from about 50 to about 80 percent by weight of the plastic formulation. Most preferably, however, the polyolefin polypropylene based material is included in the plastic formulation of the invention in an amount of from about 60 to about 75 percent by weight of the plastic formulation.

The polyolefin polypropylene based material used in the present invention is constructed from polypropylene homopolymers, copolymers including ethylene and propylene units, or a blend of polypropylene homopolymers and copolymers including ethylene and propylene units. According to one embodiment of the invention, the copolymers also include butene units and are terpolymer. Referring to the ethylene/propylene copolymers, preferably the copolymers include from about 5 to about 50 mole percent ethylene units; more preferably, from about 7 to about 35 mole percent ethylene units; and most preferably, from about 10 to about 25 mole percent ethylene units. The most preferred polyolefin polypropylene based material used in the present invention is sold under the tradenames of KS-084P, KS-085P, KS-051P and materials based on KS-080 and KS-050, by Himont U.S.A. Inc.

Referring to the functionalized block copolymer ingredient, according to one preferred embodiment, the functionalized block copolymer ingredient is included in the plastic formulation of the invention in an amount of from about 3 to about 25 percent by weight of the plastic formulation. More preferably, the functionalized block copolymer is included in an amount of from about 5 to about 20 percent by weight of the plastic formulation. Most preferably, however, the functionalized block copolymer is included in the plastic formulations of the invention in the amount of from about 5 to about 15 percent by weight of the plastic formulation. Preferably, the functionalized SEBS block copolymers of the invention are modified by maleic anhydride, epoxy, or carboxylate functionalities. Most preferably, the functionalized block copolymer is an SEBS block copolymer that contains maleic anhydride functionalized groups ("functionalized"). Such a product is sold by Shell Chemical Company under the designation KRATON RP-6509.

In some embodiments of the invention a non-functionalized SEBS block copolymer is included. Especially preferred block copolymer ingredients are commercially available under the trademark name KRATON G, product designation 1660, 1652 and 1657, for example, from the Shell Chemical Company. The non-functionalized SEBS block copolymer is included in the amount from about 1 to about 40 percent by weight; more preferably, from about 5 to about 30 percent by weight; and, most preferably, from about 10 to about 25 percent by weight.

Non-functionalized SEBS block copolymer ingredients useful in the present invention are described in U.S. Pat. No. 4,140,162, incorporated by reference herein. It is preferred that the ethylene and butylene copolymer portion of both the non-functionalized and functionalized SEBS block polymer comprises from about 50 to about 85 percent by weight of the SEBS block copolymer molecule.

Referring to the polyamide RF sealable material, the polyamide material is preferably, a nylon, more specifically, for purposes of this invention "nylon" is defined as: those polymers polymerized by condensation of a dibasic acid HOOC—$R_1$—COOH and a diamine $H_2N$—$R_2$—$NH_2$, where $R_1$ and $R_2$ are aliphatic groups having from 1 to 12 carbons; and those polymers polymerized by addition reactions of ring compounds that contain both acid and amine groups on the monomer. The nylon material is included in the plastic formulations of the invention in an amount of from about 3 to about 20 percent by weight of the plastic formulation. More preferably, the nylon material is included in an amount of from about 5 to about 15 percent by weight of the plastic formulation. Most preferably, the nylon material is included in an amount of from about 8 to 12 percent by weight of the plastic formulation. Commercially, the most preferred nylon material is available from Henkel Corporation, under the tradename of Nylon TPX, product designation 16–159.

Referring to the Figure, FIG. 1 shows a blood component storage container 10, which embodies one aspect of the invention. The container 10 may be variously configured. In the illustrated embodiment, the container 10 includes an inlet 12 to which a length of flexible tubing 14 is integrally connected.

The tubing 14 may include, at its terminal end, a phlebotomy needle (not shown). In this arrangement, the tubing 14 serves to introduce whole blood from a donor into the container 10 for processing and, preferably, storage of certain of the blood components. Preferably, whole blood or at least one blood component is contained within the container. Preferable blood components include platelets, packed red blood cells, plasma and plasma based fractions.

Alternately, the tubing 14 may communicate with the interior of another container, (also not shown) which is made of the plastic formulations of the invention. In this arrangement, the tubing 14 serves to introduce a portion of the contents of the other container into the container 10 for additional processing and, preferably, storage. Also, as illustrated, the container 10 includes a number of normally sealed, selectively openable access ports 16. Access ports 16 and inlet 12 can, in some embodiments, include a co-extruded or laminated layer of PVC (not shown). The inner PVC layer allows solvent bonding of PVC tubing to the inlet 12 of container 10.

In accordance with the invention, the walls 18 of the container 10 are made of the plastic formulations of the present invention and are sealable using heat or radio frequency sealing techniques (RF sealing). Preferably, the plastic formulations of the invention are essentially free of plasticizer. Preferably, the walls 18 have a thickness of at least 3 mils, and, more preferably, from about 5 to about 15 mils, yet remain flexible and collapsible at room temperature.

The separate ingredients of this invention may be conventionally formulated in the usual polymer blending equipment, for example, the ingredients may be tumble-blended in a ribbon blender. After blending to obtain homogenous mixture, the plastic formulations of the invention may be heated, melted, and extruded using conventional equipment. If it is desired, the material may then be extruded, co-extruded, blow molded, or otherwise processed in accordance with conventional techniques to form a suitable container.

The following examples are presented to describe preferred embodiments and utilities of the invention and are not meant to limit the invention unless otherwise stated in the claims appended hereto.

EXAMPLE 1

Gas Permeability Testing of Film

Gas permeability was measured using Oxygen Gas Permeability, ASTM D-398 (N.A.), DIN 53380 (Europe), JIS K-7126 (Asia). The "OX-TRAN" System used was manufactured by Mocon Inc., Minneapolis, Minn. The OX TRAN system utilizes unique sensors for detecting the oxygen transmission rate through flat films. According to the method used, a film specimen was clamped into the diffusion cell and the upper and lower chambers were initially purged with oxygen-free carrier gas to remove residual oxygen from the systems and to desorb oxygen from the sample. The oxygen sensor was then switched into the carrier gas flows. When stable zero was established, oxygen was introduced into the upper diffusion chamber. Molecules of oxygen which diffused through the film into the lower chamber were conveyed by the carrier gas to the sensor. The results obtained are summarized in Table 1 below.

For carbon dioxide gas permeability, the "Permatron-C-Rod" system was used for detecting the carbon dioxide transmission rate through flat films. A film was clamped between the upper and lower halves. Gaseous carbon dioxide was admitted into the upper half while $CO_2$-free nitrogen carrier gas is flushed through the bottom half. A test cycle began when the nitrogen side was automatically switched to the infrared sensor. As molecules of $CO_2$ permeated through the test sample and into the closed loop, the infrared sensor monitors the carbon dioxide transmission rate through the film.

TABLE 1

| Polymer Component | % in Formula 1 | | % in Formula 2 | | % in Formula 3 | |
|---|---|---|---|---|---|---|
| Himont PP KS-085 | 60 | | 70 | | 75 | |
| Shell Kraton G 1660 | 25 | | 10 | | — | |
| Henkel Nylon TPX-16-159 | 10 | | 10 | | 10 | |
| Shell Kraton RP 6509 | 5 | | 10 | | 15 | |
| Materials Properties | Nipped | Cast | Nipped | Cast | Nipped | Cast |
| $CO_2$ (cc/1000 in 2/day) | 644 | 1260 | 1598 | 2482 | 539 | 630 |
| Thickness (Mil) | (10) | (10.3) | (8.9) | (9.2) | (10.6) | (8.7) |
| $O_2$ (cc/1000 in 2/day) | 272 | 283 | 202 | 566 | 249 | 267 |
| Thickness (Mil) | (9.9) | (10.2) | (9.3) | (9.3) | (9.6) | (10.1) |
| Melt Temp (Tm) | 165C | 163C | | | 163C | 166C |

| Polymer Component | % in Formula 4 | | % in Formula 5 | | Formulation 6 Control |
|---|---|---|---|---|---|
| Himont PP KS-051P | 70 | | 80 | | |
| Shell Kraton G1660 | 10 | | — | | |
| Henkel Nylon TPX-16-159 | 10 | | 10 | | |
| Shell Kraton RP 6509 | 10 | | 10 | | |
| Materials Properties | Nipped | Cast | Nipped | Cast | Blow Molded |
| $CO_2$ (cc/1000 in 2/day) | 1242 | 1760 | 1081 | 1114 | 675 |
| Thickness (Mil) | (11.9) | (10.3) | (9.8) | (10.0) | (13.8) |
| $O_2$ (cc/1000 in 2/day) | 304 | 307 | 279 | 267 | 189 |
| Thickness (Mil) | (11.6) | (11.3) | (10.3) | (10.3) | (13.8) |

Formulation 6 (Control) is PL-732, a commercially available non-PVC film manufactured by Baxter Healthcare, Deerfield, Ill., used in the construction of platelet storage containers. Formulations 1–5 are films made from the plastic formulations of the invention constructed as described in Example 3. With regard to $O_2$ diffusion, the film of the invention was superior to the commercial film tested. Referring to $CO_2$ diffusion, the film of the invention was much better than the commercial film.

EXAMPLE 2

Platelet Storage Capacity

The data indicated that the platelet storage capacity in a platelet container constructed from the plastics of the invention are greater than for commercial platelet storage containers generally. pH, $pCO_2$, and $pO_2$ are as good, or better, than observed with commercially available platelet storage containers such as PL-732. These parameters are important to ensure platelet survival. In fact, total platelet survival, for 1 and 5 days, was as good, or better, than for commercial platelet storage containers generally. Morpholoy scores were well within acceptable parameters. Generally, a score of 250 is considered acceptable. The results are summarized in Table 2 below.

TABLE 2

| **Day of Storage | Total WBCs ($\times 10^8$) | Total Platelets ($\times 10^{11}$) | pH | $pCO_2$ (mmHg) | $pO_2$ (mmHg) | Morphology Score (Max = 400) | Clumping (No Clumping = 5) |
|---|---|---|---|---|---|---|---|
| 1 | 0.38 | 0.92 | 7.22 | 35.5 | 132 |  | 5 |
| 5 | 0.19 | 0.85 | 7.17 | 30.0 | 139 | 304* | 4 |
| 1 | 1.89 | 0.94 | 7.27 | 40.0 | 116 |  | 5 |
| 5 | 1.82 | 0.99 | 7.09 | 31.6 | 127 | 366* | 4.5 |

*Morphology score was performed on day 6.
**The plastic formulation used in the platelet container is described in Example 1, Table 1 as Formula 1.

EXAMPLE 3

Formulation

TABLE 3

| Polymer Component | % in Formula 1 |
|---|---|
| Himont PP KS-085P | 60 |
| Shell Kraton G1660 | 25 |
| Henkel Nylon TPX-16-159 | 10 |
| Shell Kraton RP 6509 | 5 |

Each component was weighed and blended using a ribbon blender. This blend was pelletized following standard extrusion techniques. The pelletized material was used to cast a monolayer film. The cast material may also be nipped to form film. The film thickness was 9.3 to 11.6 mils. The thickness range of the film is preferably from about 3 to about 15 mils.

Changes can be made in the composition, operation and arrangement of the method of the present invention described herein without departing from the concept and scope of the invention as defined in the following claims:

We claim:

1. A flexible, collapsible container containing a blood component, the container being capable of being RF sealed, gas, steam and radiation-sterilized and being made from an admixture comprising:

a) from about 40 to about 90 percent by weight of a polyolefin material selected from the group consisting of polypropylene homopolymers, copolymers including ethylene and propylene units, and blends of polypropylene homopolymers and copolymers including ethylene and propylene units;

b) from about 3 to about 25 percent by weight of a functionalized block copolymer, the functionalized block copolymer consisting essentially of a central block copolymer molecule including generally equal proportions of ethylene and butylene units, and terminal blocks of polystyrene; and c) from about 3 to about 20 percent by weight of a nylon; the container being gas permeable.

2. The container containing a blood component of claim 1 wherein the admixture further includes:

d) from about 1 to about 40 percent by weight of a non-functionalized block copolymer, the non-functionalized block copolymer consisting essentially of a central block copolymer molecule including generally equal proportions of ethylene and butylene units, and terminal blocks of polystyrene.

3. The container of claim 2, wherein the polyolefin material is included in an mount of from about 50 to about 80 percent by weight; the functionalized block copolymer is included in an amount of from about 5 to about 20 percent by weight; the nylon is included in an amount of from about 5 to about 15 weight percent; and the non-functionalized block copolymer is included in an amount of from about 5 to about 30 percent by weight.

4. The container of claim 2, wherein the polyolefin material is included in an amount of from about 60 to about 75 percent by weight; the functionalized block copolymer is included in an amount of from about 5 to about 15 percent by weight; the nylon is included in an amount of from about 8 to about 12 weight percent; and the non-functionalized block copolymer is included in an amount of from about 10 to about 25 percent by weight.

5. The container containing a blood component of claim 1 wherein the blood component is selected from the group consisting of cryoprecipitate, fresh frozen plasma, plasma, packed red blood cells, and platelets.

6. The container containing a blood component of claim 1 wherein the blood component is platelets.

* * * * *